United States Patent
Kuse et al.

(10) Patent No.: US 12,416,154 B2
(45) Date of Patent: Sep. 16, 2025

(54) SANDWICH WALL CONSTRUCTION FORMED OF SPACED-APART SLABS WITH INSULATION IN-BETWEEN HAVING A HIGH CARBON CONTENT

(71) Applicants: Kolja Kuse, Munich (DE); Nikolas Hagemann, Boeblingen (DE)

(72) Inventors: Kolja Kuse, Munich (DE); Nikolas Hagemann, Boeblingen (DE)

(73) Assignees: Kolja Kuse, Munich (DE); Nikolas Hagemann, Boeblingen (DE)

( * ) Notice: Subject to any disclaimer, the term of this patent is extended or adjusted under 35 U.S.C. 154(b) by 132 days.

(21) Appl. No.: 17/420,910

(22) PCT Filed: Jan. 6, 2020

(86) PCT No.: PCT/EP2020/000001
§ 371 (c)(1),
(2) Date: Jul. 6, 2021

(87) PCT Pub. No.: WO2020/141185
PCT Pub. Date: Jul. 9, 2020

(65) Prior Publication Data
US 2022/0106789 A1    Apr. 7, 2022

(30) Foreign Application Priority Data
Jan. 6, 2019   (DE) .................... 20 2019 000 008.9

(51) Int. Cl.
*E04C 2/288*      (2006.01)
*B32B 3/10*       (2006.01)
(Continued)

(52) U.S. Cl.
CPC .............. *E04C 2/288* (2013.01); *B32B 3/10* (2013.01); *B32B 5/18* (2013.01); *B32B 7/12* (2013.01);
(Continued)

(58) Field of Classification Search
CPC ....... B32B 13/02; B32B 13/045; B32B 13/12; B32B 17/066; B32B 2260/021;
(Continued)

(56) References Cited

U.S. PATENT DOCUMENTS

2019/0337861 A1* 11/2019 Luthe ..................... C04B 38/10

FOREIGN PATENT DOCUMENTS

CN    207892122 U  *  9/2018
DE    19545097 A1    6/1997
(Continued)

OTHER PUBLICATIONS

Translation of WO 2009129839 A1, Mera Kuse, Oct. 29, 2009. (Year: 2009).*

(Continued)

*Primary Examiner* — Hai Vo
(74) *Attorney, Agent, or Firm* — Perry + Currier Inc

(57) ABSTRACT

The invention describes the construction of more or less thin house walls, of which the load-bearing panels are stabilized in such a way that they have an insulating middle layer, the middle layer containing carbon, which is brought in as insulation material by means of suitable binders such as cement, geopolymers, resins or foams or glass. In particular, biochar mortars and biochar foams are used, which with the help of fiber reinforcement of the outer stone slices become self-supporting wall and facade elements, which are able to store more carbon than what is produced in the form of CO2, escaping into the atmosphere. Fiber-stabilized stone disks with an insulating middle layer based on pyrogenic or otherwise manufactured or extracted carbon are constructed symmetrically and dimensioned in such a way that they can absorb loads and buckling forces with a comparatively very (Continued)

Cross section F - F low weight. For this reason, in addition to its high carbon content, the insulation material should preferably have sufficient tensile stability.

3 Claims, 3 Drawing Sheets

(51) Int. Cl.
| | |
|---|---|
| B32B 5/18 | (2006.01) |
| B32B 7/12 | (2006.01) |
| B32B 9/00 | (2006.01) |
| B32B 9/04 | (2006.01) |
| B32B 13/02 | (2006.01) |
| B32B 13/04 | (2006.01) |
| B32B 13/12 | (2006.01) |
| B32B 17/06 | (2006.01) |
| B32B 27/06 | (2006.01) |
| B32B 27/20 | (2006.01) |
| E04B 2/00 | (2006.01) |

(52) U.S. Cl.
CPC .............. *B32B 9/002* (2013.01); *B32B 9/005* (2013.01); *B32B 9/046* (2013.01); *B32B 13/02* (2013.01); *B32B 13/045* (2013.01); *B32B 13/12* (2013.01); *B32B 17/066* (2013.01); *B32B 27/065* (2013.01); *B32B 27/20* (2013.01); *E04C 2/46* (2013.01); *B32B 2260/021* (2013.01); *B32B 2260/046* (2013.01); *B32B 2266/04* (2013.01); *B32B 2266/057* (2016.11); *B32B 2307/304* (2013.01); *B32B 2307/54* (2013.01); *B32B 2419/00* (2013.01)

(58) Field of Classification Search
CPC .......... B32B 2260/046; B32B 2266/04; B32B 2266/057; B32B 2307/304; B32B 2307/54; B32B 2419/00; B32B 27/065; B32B 27/20; B32B 3/10; B32B 5/18; B32B 7/12; B32B 9/002; B32B 9/005; B32B 9/046; E04C 2/288; E04C 2/2885; E04C 2/296; E04C 2/46
See application file for complete search history.

(56) References Cited

FOREIGN PATENT DOCUMENTS

| DE | 202008005770 U1 | 12/2008 | |
|---|---|---|---|
| EP | 2017075 A1 | 1/2009 | |
| EP | 2463330 A2 | 6/2012 | |
| EP | 2350404 B1 | 6/2018 | |
| JP | 2003306981 A * | 10/2003 | |
| WO | WO-2009129839 A1 * | 10/2009 | ............. E04C 2/288 |
| WO | WO-2015118018 A1 | 8/2015 | |

OTHER PUBLICATIONS

Translation of CN 207892122 U, Xiao-ming Wu, Sep. 21, 2018. (Year: 2018).*

Farges et al., "Insulating Foams and Dense Geopolymers from Biochar By-Products", J. Ceram. Sci. Technol., 9 [2} 193-200, 2018. (Year: 2018).*

Translation of JP-2003306981-A, Masanori Takao, Oct. 31, 2003. (Year: 2003).*

* cited by examiner

SANDWICH WALL CONSTRUCTION FORMED OF SPACED-APART SLABS WITH INSULATION IN-BETWEEN HAVING A HIGH CARBON CONTENT

The present invention relates to a wall construction as already described in EP08874021.2 for the construction of houses and buildings. This wall construction has a symmetrical structure made of pressure-resistant panels that are held at a certain distance. The insulating layer, which stiffens the construction across the cross-section, is located between the plates. The two plates absorb the compressive forces and are made of particularly pressure-resistant material such as natural stone, artificial stone of all types, concrete and other earthenware, as well as ceramics through to glass-containing substances or glass—hereinafter referred to as earthenware—which are pressure-resistant, but are marked usually also by a brittle structure prone to breakage. Natural stones such as granite, granite-like stones such as gneiss, as well as marble, limestone, high-pressure-resistant modern ceramics, glass ceramics or glass should be mentioned here, as well as all other materials made of stone or ceramic and naturally or artificially created earthenware. The two plates can each consist of the same material, or each of a different material, for example the outer stoneware disc made of natural stone and the inner stoneware disc made of concrete.

On the one hand, these materials are characterized by a high load capacity under compressive stress with a comparatively low specific weight, but such materials are also relatively unstable under tensile and bending loads, especially if they are to be kept as thin as possible and save material and, in particular, should be dimensioned as lightweight as possible. This is why these panels are provided with tensile-resistant reinforcement and, for example, made tensile-resistant with the help of fiber materials. Here coatings with the help of fibers that are as stable as possible in tension and binders or resins that are as temperature-stable as possible are used to coat the fiber with the stone surface. Carbon fibers, glass fibers or stone fibers or a mixture of these fibers and resins such as silicone resins or water glass binders, which are temperature-stable up to over 500° C., are suitable. In extreme cases, silicate-based adhesives or a mixture of such binders can also be used.

The main goal in this invention is to bind as much carbon as possible in the insulation material, which can additionally stiffen the overall construction in order to make the construction material as a whole as CO2-negative as possible.

For this purpose, an insulation material based on biochar or artificially produced coal is used. Biochar is the solid form of carbon, which is formed during the pyrolysis of biomass, which is characterized by its highly porous structure and a carbon content of over 50%. All biomasses such as wood, harvest residues, green road material, solid fermentation material from biogas plants or sewage sludge can be used as the starting material for the biochar to be used in the insulation material. Alternatively, artificially produced coal can also be used for the insulation layer, which is obtained directly from CO2 with the help of electrical or electromagnetic energy and/or electrolytic processes. Although these processes are more energy-intensive, they are also interesting in countries with a high renewable electricity mix. The carbon serves the purpose of good thermal insulation, reduces the weight of the insulation layer and ensures permanent storage of carbon in the system.

The carbon is introduced into the space between the pressure-stable plates, for example with a binding agent or a proppant, so that the plates are firmly bonded to one another through the insulation layer. Cement, hydraulic lime, geopolymers, epoxy or polyester resins, but also plastic-based, glass-based and mineral-based foams can be used as binders for the coal, e.g. PUR foam, expanded glass or glass foam. Other fillers to improve physical properties such as tensile strength, heat conduction, radiation, etc. are advantageous. Loose beds of coal-based materials can also be used if the two stone slabs are each designed to be self-supporting so that there is no need for a permanent bond.

Figure 1:
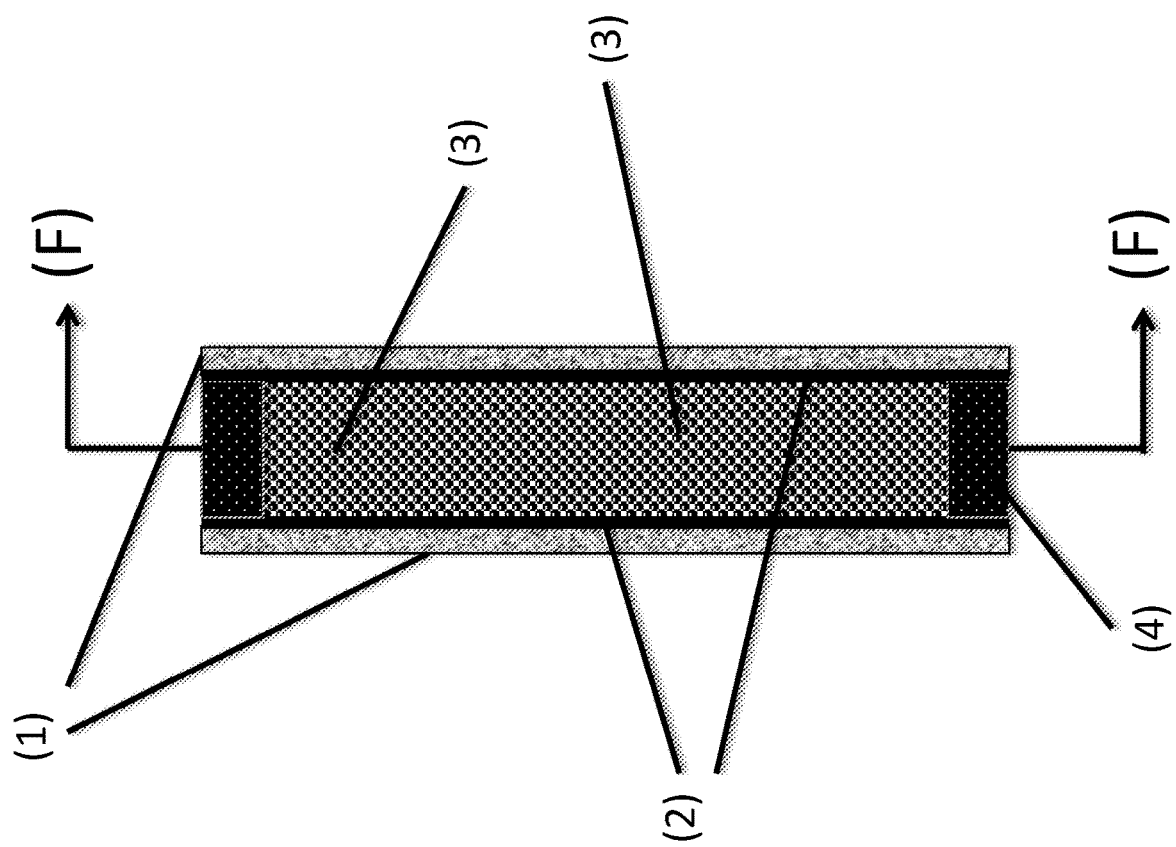
FIG. 1 is a side view of a wall element.

The present invention proposes a way of upgrading such thin stone or earthenware slabs or ceramic or artificial stone slabs, which are sustainably stabilized in an inexpensive manner, and which become self-supporting wall elements in the way proposed here, as carbon sinks that are as effective as possible. The stone, the ceramic or the glass and other pressure-resistant materials such as thin concrete slabs—generally referred to here as earthenware—which previously meant additional weight for the construction of buildings purely as facade cladding, are now becoming themselves the load-bearing element of the house wall and the coal-based insulation layer together with the preferably used carbon fibers, in case they are made from organic oil, are becoming an efficient carbon sink.

It is important that such wall elements remain dimensionally stable over a wide temperature range and that the "bi-metal effect" is suppressed. To achieve this goal, it is necessary to stabilize the earthenware or ceramic plates against tension and the associated breakage. In addition, on the stone side to be stabilized at the interface between the stone to be stabilized and the insulation layer, the expansion distribution must be set in such a way that its gradient is practically zero, so that the stone slab neither on one side nor on the other side, even with changing temperatures, is bent and thus the visible surface remains straight and flat over a large area and does not bowl.

For this it is important that the insulating intermediate layer is so porous and therefore stable to expansion that the fiber material is able to control the expansion of all components without the boundary layers are delaminating from one another. The invention proposes such a way of a symmetrical wall structure, that the feature of the flatness of the stone slab in wide temperature and pressure ranges is becoming a further essential core of the invention, in combination with a third characteristic feature of the use of the facade element itself as a load-bearing part, which is carried out with the help of a stable fiber layer, which is preferably made of vegetable-based carbon or alternatively consists of low-energy fibers such as glass fibers or stone fibers.

The path ensures that the earthenware is stabilized under the most varied of thermally induced mechanical loads, as well as purely mechanical loads, in such a way that it is on the one hand, and in particular, stabilized against mechanical destruction by tearing the wall panel through a stabilization that is suitable for the respective use and load cases can also be protected against thermal bending. The dimensional stability in the case of temperature differences on the inside and outside of the wall and also the temperature changes caused by it on the weather-dependent side is also of significant importance, which can also be supported by the fact that the panels are made of different materials with different expansion coefficients.

The core of the solution, to find the most suitable insulation material for such self-supporting walls in sandwich construction, is to keep the total expansion coefficient of the inner and outer panels as small as possible and, in particular, as equal as possible, to enable the binding capability of carbon, to ensure good fire protection behavior and to have a high insulation value, as well as to be dimensionally stable, waterproof and frost-proof. In addition to mineral foams, most promising candidates are biochar-based building materials that have sufficient flexibility and sufficient tensile strength to prevent them from buckling by gluing them to the fiber-stabilized earthenware panels.

So far little known are designs in which, for example, the natural stone slab itself becomes a load-bearing element and thus fulfills two functions: on the one hand, it optimally takes over the structural requirements in house construction and at the same time offers an optimal appearance.

The optimum statics are achieved by the fact that such a natural stone slab made of granite, for example, has twice as high load-bearing capacity as a comparable concrete slab of the same weight. This enables lighter, taller and more space-saving construction in comparison to classic concrete and brick construction. Even compared to building with steel, weight and space are saved because, for example, granite with a specific weight of aluminum is 2.7 times lighter than steel, but has a pressure stability that comes close to that of structural steel.

A structural description of the wall construction follows. The invention applied for relates to the construction sector, in particular building construction, more precisely house construction with service buildings, residential buildings, pavilions, halls and any type of building in general. The essence of the invention relates to a technology for creating a house wall as a building element, with the functions of static load transfer and the facade with all the functions of a building envelope and the corresponding physical requirements according to the current standards, which is now also to be upgraded to become a carbon sink via the insulating materials.

The wall elements are prefabricated and placed on the construction site. The ceiling structures are placed on the wall elements. The wall elements combine all static and structural requirements in a sandwich structure. The outer thin disks made of earthenware or other pressure-resistant materials mainly take on the normal forces (disk forces). They can be used directly as finished surfaces, both indoors and outdoors. The core of the sandwich is formed by a carbon-based, preferably shear-resistant, heat-insulating material that either connects the adjacent discs or only fulfills the insulating properties if the two discs are self-supporting without a shear-stiff connection. In the case of a rigid connection, the core absorbs the shear forces from bending loads, resulting in sufficient flexural rigidity across the element. The element is thus secured against buckling and loads occurring horizontally across the element, such as wind loads, which can be absorbed. The load introduction and load dissipation construction from the floor slabs to this sandwich element brings the vertical loads symmetrically onto the discs without creating a physically unsustainable thermal bridge. The water tightness and vapor tightness is guaranteed by the interaction of the sandwich materials with special connection details. The load level without additional static structures is at working loads of $>=75$ kN/m. The elements are installed as pendulum supports in the ceilings above and below based on the static principle. The thermal insulation values can reach the Swiss Minergie standard.

The thin discs are made of a pressure and shear resistant, waterproof material such as concrete, natural stone, glass, ceramics. They are secured by reinforcements against tensile loads from thermally asymmetrical deformations and against tensile stresses in the area of stress distribution in the load intake zones, which could lead to unannounced total brittle fractures. Imperfections in the material and in the construction can also be bridged and a good-natured, as ductile as possible material behavior is generated. The sandwich core consists of a shear-resistant, highly insulating structure, usually made of a sufficiently firm foam or other binding agents with biochar or artificially produced charcoal.

The load introduction consists of a thermally weakly conductive pressure and shear-resistant element made of glass fiber composite or wood or a framework or made of carbonaceous mineral material.

The connections between the discs and the load intake elements and, if applicable, the insulation core are realized by gluing using permanent, shear-resistant bonds. Commercially available adhesives are used, either based on resin or mineral adhesive such as high-temperature-resistant water glasses with a temperature resistance of at least 500° C.

As insulating layers, all possible solutions that stiffen the cross-section or also beds that have a high carbon content can be used. This is carbon of fossil or non-fossil origin that has been removed from the atmosphere by plant photosynthesis or consists of industrially separated CO2. The plant carbon is stabilized by pyrolytic treatment and can then no longer be broken down microbially. Installed in the insulating layer between the stone discs, the biochar represents a long-term carbon sink.

The use of fiber materials with a matrix is proposed to stabilize the stone slabs themselves. In particular, carbon fibers are used, which are preferably produced from biomass or directly from CO2. Furthermore, stone fibers and natural fiber materials, which stabilize the stone over a large area and prevent it from expanding and breaking, can also be used. The natural stone itself has a very low expansion module, which can be adjusted with the fiber stabilization, since natural stone is compressible due to its porous structure. In the event that the fiber tension is correspondingly large and the correct fiber is used, the fiber can be used to bring a corresponding pre-tension into the composite of fiber matrix and stone, so that temperature-related expansion of the stone slab is minimized. The result is a sheet that can withstand compression and tension, which in normal applications ensures adequate stabilization of the stoneware against tearing and breakage and, above all, remains straight and even. This makes this plate in the symmetrical overall composite—fiber-stabilized stone plate—insulation cross-section—further fiber-stabilized stone plate—attractive not only from the point of view of the optics in the interior and exterior, but also represents a wall construction that is about twice lighter or can be kept thinner with the same load-bearing capacity than conventional house walls and building structures.

The carrier material, hereinafter referred to as carrier, consists—as described for example in patent application EP 106 20 92—of a fiber-reinforced matrix which is a synthetic resin or eventually even a ceramic material. For example, carbon fibers are used that withstand high tensile loads and contract under the influence of heat, i.e. have a negative temperature expansion coefficient and sustainably stabilize a more or less thin stone slab even under changing temperature loads. This protects the plate in particular against cracks caused by overstretching, and counteracts breakage caused by mechanical stress perpendicular to the earthenware. With the help of, for example, temperature-stable epoxy resins, polyester resins, resins based on phenol, polyimide, cyanate ester, melamine, polyurethane, silicone or silicate or water glass, called a matrix, in combination with for example carbon fibers, which have a negative temperature expansion coefficient, such a reliable stabilization is also possible for very large stone slabs, which are of the height of an entire story. In addition, the requirement is met to optimize the mechanical strength and temperature resistance of thin stone structures in such a way that the total expansion coefficient of the plate is controlled in a wide temperature range in order to avoid the bowl of the entire plate and still achieve a lightweight construction. In order to introduce the compressive forces that must be absorbed by such a house wall into the wall, the invention describes a suitable solution with the help of frameworks made of glass fiber parts or solid material, for example made of biochar-based materials, which on the one hand have a high pressure resistance and on the other hand as much as possible insulating properties in order to introduce the force effectively into the fiber-reinforced stone slabs on the one hand and still avoid thermal bridges in order not to allow any condensation and thus mold formation. The overall construction of the novel wall construction described here takes into account the fact that the necessary vapor barrier is built into the fiber matrix. Both the stone slabs and the carbon-based materials of the insulation layer can absorb and release water and thus have a regulating effect on the moisture balance in the interior. The stone slabs have the same effect on the outside and can thus become a cooling surface in summer when the moisture stored in the stone and insulation material evaporates. If suitable granite is used, then such house walls are absolutely frost-proof and corrosion-free and practically do not age, especially if they are polished on the outside. Due to the high adsorption capacity of the biochar in the insulation layer, there is no leakage of condensation water, which prevents any mold formation.

If such walls are now additionally made in the insulation layer in such a way that they have a high carbon content, then this carbon not only improves the insulation properties and moisture regulation, the coefficient of expansion and the weight of the insulation layer are reduced, but the components are also, due to the high Volume of the insulation layer, an efficient carbon sink, in order to enable the achievement of the climate goals through a building material adapted to the climate problem. While the construction with previous building materials caused CO2 emissions, this new construction method uses CO2-negative materials. The building material stores or sequesters more carbon in the material than was used in its manufacture.

In particular, biochar-based cement or geopolymer mortars, biochar-based resins or foams made of PU, glass or mineral foams are used, which, with the help of fiber reinforcement of the outer stone slabs, become self-supporting wall and facade elements, which are capable of storing more carbon than what is produced in the form of CO2, escaping into the atmosphere during its production. Fiber-stabilized stone disks with an insulating layer of foam material in the middle layer are constructed symmetrically and dimensioned in such a way that they can absorb loads and buckling forces with a comparatively low weight. For this reason, the insulation material must have adequate tension stabilization, if necessary, despite a high carbon content. Otherwise, the carbon can also be mixed into loose insulating materials made of glass wool or rock wool, if the two stoneware disks are self-supporting, which can be achieved by the fact that the respective disk itself consists of two stone layers with a middle layer of fiber matrix.

Figure 2:
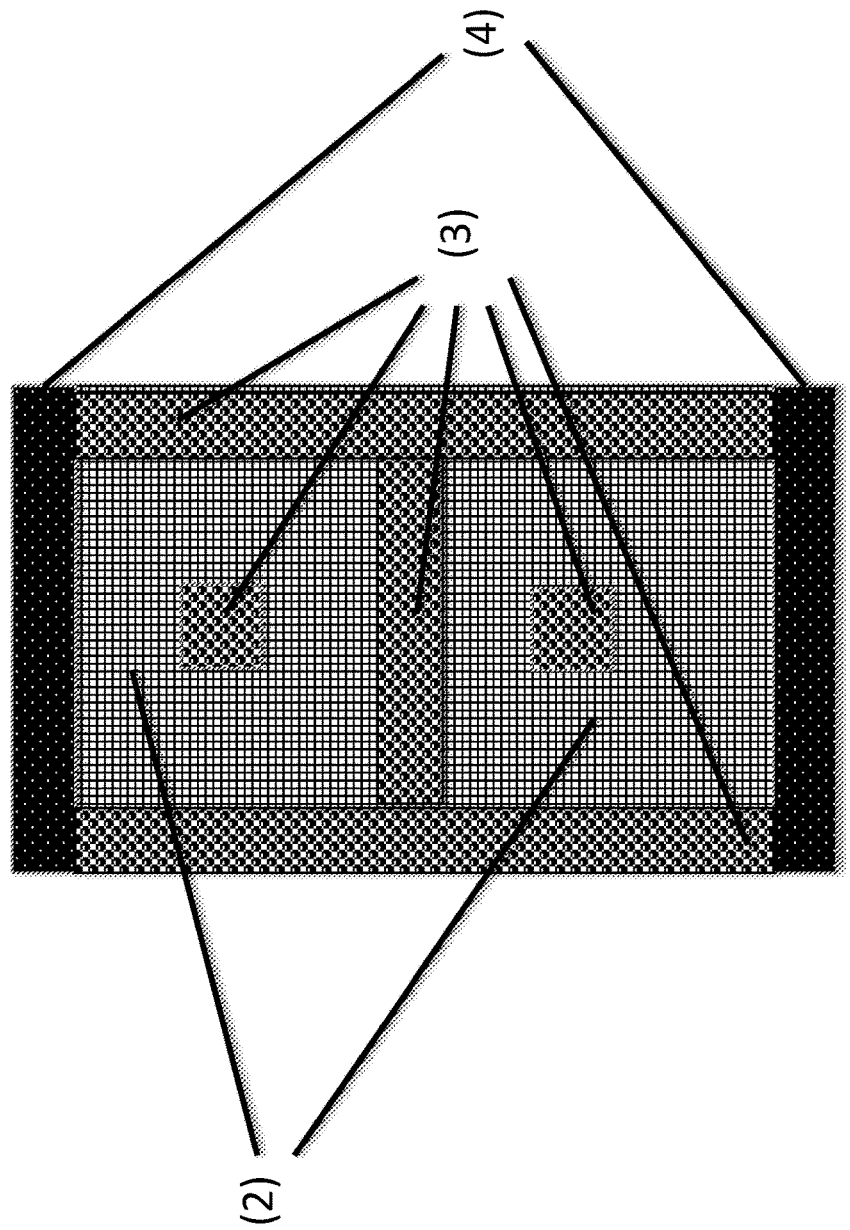
FIG. 2 is a diagram showing the cross section F-F of the wall element of FIG. 1.

One of the many possible embodiments is shown in FIG. 1. The figure shows two stone slabs (1) which are stabilized with one Carbon layer (2). An insulation layer (3) with a high carbon content is attached between the fiber-coated stone slabs. The insulation layer (3) has sufficient tensile strength so that the panels cannot buckle outwards. The sufficiently tensile-stable insulation layer (3) can be designed over the entire surface or, as shown in cross-section in FIG. 2, only over part of the surface, meaning that the stone slabs are prevented from buckling in the middle area. Both figures also show the load introduction intakes (4) above and below.

Figure 3:
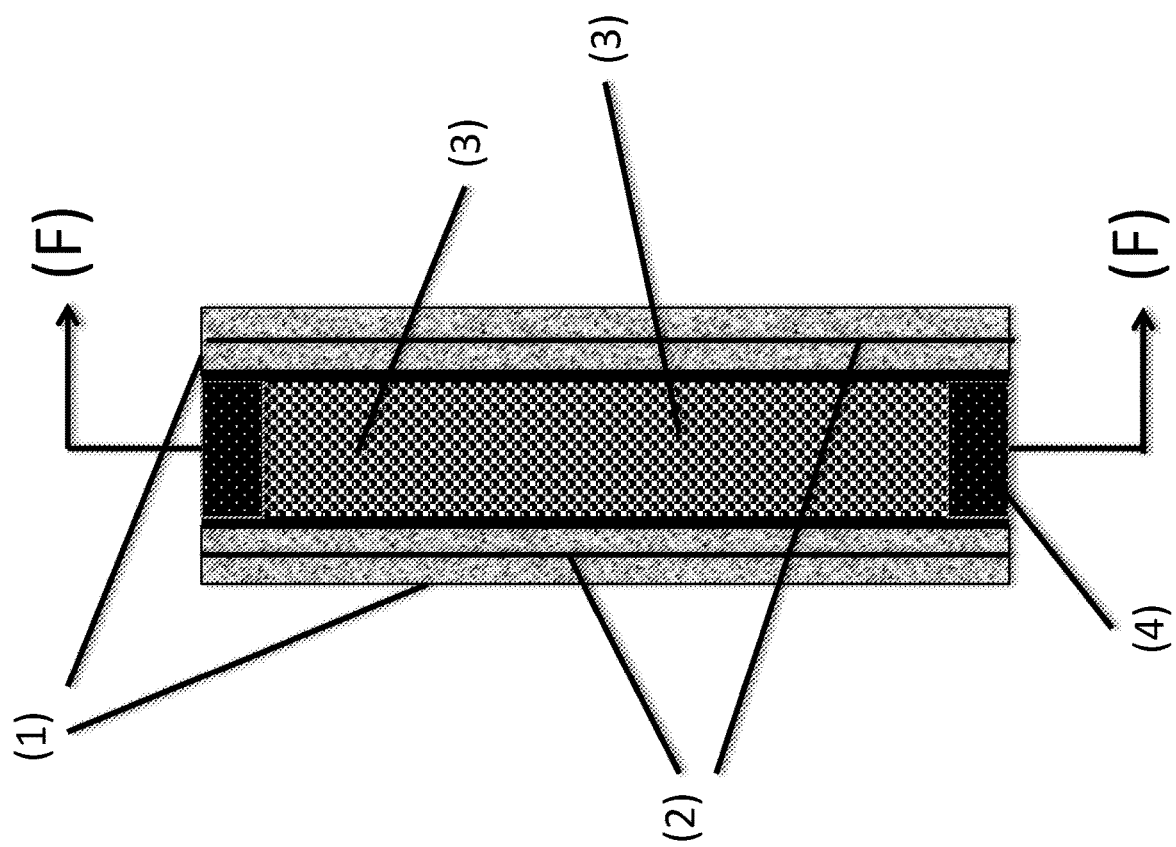
FIG. 3 is a side view of another wall element.

In FIG. 3 it is shown that the fiber-coated stone slabs are made in such a way that each of the slabs is made from two stone slabs with an internal carbon layer. In the middle there is an insulation layer (3) that has a high carbon content. The insulation layer (3) is loosely fitted or attached between the stone slabs and has no stiffening function.

The invention claimed is:

1. A load-bearing wall element for buildings, the load-bearing wall element having an upper end, a lower end, a first side and a second side opposite the first side, comprising:
   a first support plate and a second support plate spaced apart from the first support plate to form two symmetrically arranged support plates, wherein each support plate is made of at least one of natural stone, artificial stone, ceramic, concrete, glass, or glass-containing material;
   a first fiber-containing matrix layer on an inner side of the first support plate,
   a second fiber-containing matrix layer on an inner side of the second support plate,
   wherein each fiber-containing matrix layer includes carbon fibers, and at least one of epoxy resin, polyester resin, phenolic resin, polyamide resin, cyanate ester resin, melamine resin, polyurethane resin, silicone resin, silicate resin, ceramic, or water glass;
   a first load introduction intake structure positioned at the upper end of the wall, disposed between and bonded to the first and second fiber-containing matrix layers via permanent, shear-resistant adhesives,
   a second load introduction intake structure positioned at the lower end of the wall, disposed between and bonded to the first and second fiber-containing matrix layers via permanent, shear-resistant adhesives;
   a shear-resistant layer made of a carbon-containing insulation material including a cement binder and carbon in powder form,
   wherein the shear-resistant layer comprises:
   (i) a first side portion at the first side of the wall extending from the first load introduction intake structure to the second load introduction intake structure,
   (ii) a second side portion at the second side of the wall extending from the first load introduction intake structure to the second load introduction intake structure and spaced apart from the first side portion,
   (iii) a central portion extending between the first side portion to the second side portion,
   (iv) a first reinforcing portion above the central portion and spaced apart from the central portion, and the first and second side portions, (v) a second reinforcing portion below the central portion and spaced apart from the central portion, and the first and second side portions;

wherein the load-bearing wall element is a sandwich structure comprises a cavity defined by the first and second load introduction intake structures, and the shear-resistant layer, wherein the cavity is sealed by the first and second support plates, and the first and second fiber-containing matrix layers.

2. The load-bearing wall element of claim 1, wherein the load-bearing wall element is used as a load-bearing part in construction, a prefabricated house element, or a load-bearing element in high-rise construction.

3. The load-bearing wall element of claim 1, wherein the carbon of the insulation layer is obtained directly from $CO_2$ with the aid of electrical or electromagnetic energy and/or electrolytic processes.

* * * * *